(12) United States Patent
Sugawa et al.

(10) Patent No.: US 8,284,872 B2
(45) Date of Patent: Oct. 9, 2012

(54) BURST MODE RECEIVER

(75) Inventors: Jun Sugawa, Tachikawa (JP); Hiroki Ikeda, Hachioji (JP); Masayoshi Yagyu, Hanno (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 12/687,184

(22) Filed: Jan. 14, 2010

(65) Prior Publication Data

US 2010/0183107 A1  Jul. 22, 2010

(30) Foreign Application Priority Data

Jan. 16, 2009 (JP) ................................. 2009-007980

(51) Int. Cl.
*H04L 27/00* (2006.01)

(52) U.S. Cl. ........ 375/326; 375/316; 375/340; 375/354; 375/355; 370/503; 370/508; 370/509; 370/510; 370/511; 370/512; 370/513; 370/514; 455/502; 327/141; 714/707; 329/361; 341/122

(58) Field of Classification Search .................. 375/316, 375/326, 340, 354, 355; 370/503, 508, 509, 370/510, 511, 512, 513, 514; 455/502; 327/141; 714/707; 329/361; 341/122

See application file for complete search history.

(56) References Cited

U.S. PATENT DOCUMENTS 7,382,987 B2 *  6/2008  Misaizu et al. ............... 398/202
7,574,146 B2 *  8/2009  Chiang et al. ................. 398/209
2009/0279886 A1 * 11/2009  Suvakovic ..................... 398/26

FOREIGN PATENT DOCUMENTS

JP  2001-352353 A  12/2001
JP  2006-254061 A   9/2006

OTHER PUBLICATIONS

IEEE 802.3av, Part 3: Carrier Sense Multiple Access with Collision Detection (CSMA/CD) Access Method and Physical Layer Specifications, Oct. 30, 2009.

* cited by examiner

*Primary Examiner* — Leon Flores

(74) *Attorney, Agent, or Firm* — Mattingly & Malur, PC

(57) ABSTRACT

A burst mode receiver including a CDR circuit that does not perform bit synchronization determination at a wrong position even when a burst signal waveform containing a distortion is input is provided. The burst mode receiver includes a CDR circuit for reproducing clock and data from a received signal, a bit synchronization determination circuit for determining whether the CDR circuit is in an optimum phase, a waveform distortion determination circuit for determining from the received signal whether there is waveform distortion, and a CDR output enable determination circuit for determining whether an output of the CDR circuit is valid or invalid. The CDR output enable determination circuit performs CDR output enable determination based on a bit synchronization determination result and a waveform distortion determination result.

14 Claims, 20 Drawing Sheets

PRIOR ART

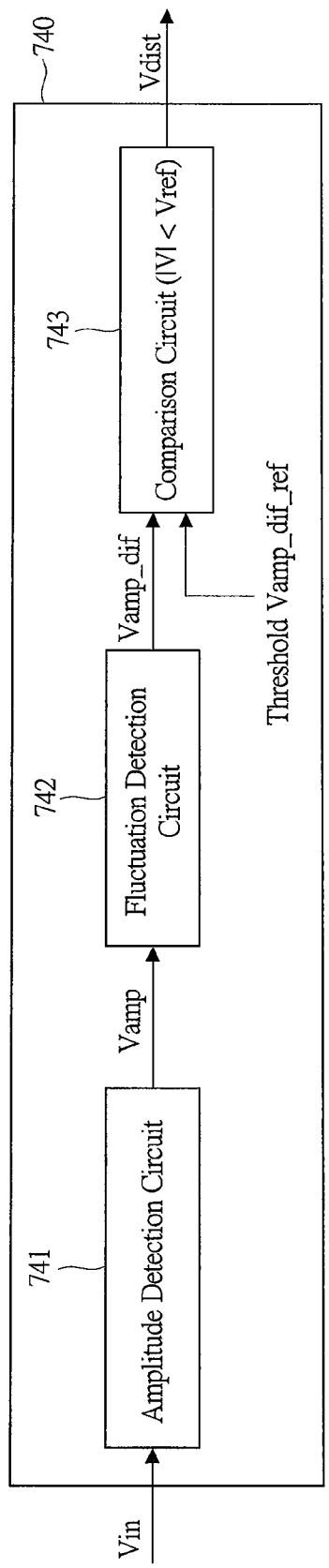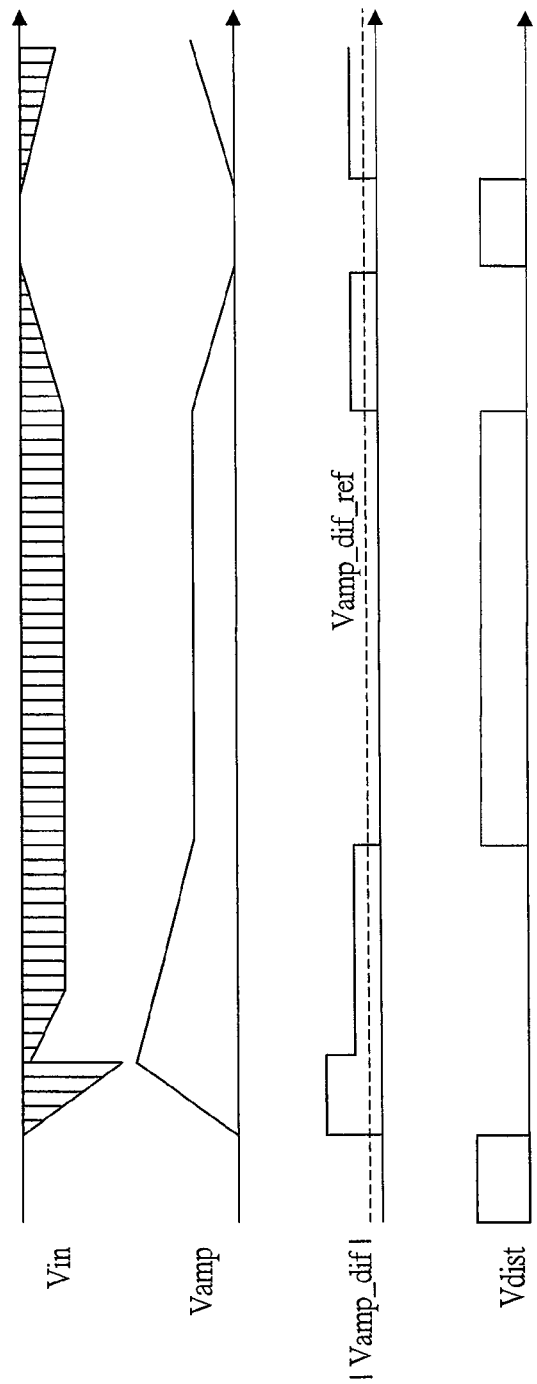
FIG. 13A
FIG. 13B

BURST MODE RECEIVER

CROSS-REFERENCE TO RELATED APPLICATION

The present application claims priority from Japanese Patent Application No. JP 2009-007980 filed on Jan. 16, 2009, the content of which is hereby incorporated by reference into this application.

TECHNICAL FIELD OF THE INVENTION

The present invention relates to a passive optical network (PON) of an optical access system, and more particularly to a technique effectively applied to a circuit that receives an upstream burst signal of the PON.

BACKGROUND OF THE INVENTION

[PON]
As an optical access system, a PON has been known, in which an OLT (Optical Line Terminal) located on a station side and an ONU (Optical Network Unit) located on a subscriber side are connected in a one-to-n manner (n is an integer equal to or larger than 2) by the equipment passively performing multiplexing and demultiplexing of optical signals such as an optical splitter. FIG. 1 shows a network configuration in the PON.

[Burst Signal]
Upstream optical signals from a plurality of ONUs to the OLT are multiplexed by the optical splitter. Also, distances between the OLT and each of the ONUs, that is, optical fiber lengths are not always equal to each other. Hence, the optical signals received at the OLT become burst signals whose intensity varies greatly.

[Configuration of Burst Signal]
FIG. 2 shows the burst signal which the OLT receives. The burst signal can be divided into a signal enable region and a signal disable region, and the signal enable region further includes a Laser ON region, a Sync Pattern region, a Burst Delimiter region, a Data region, a Burst Terminator region and a Laser OFF region (see, for example, IEEE802.3av (Non-Patent Document 1)).

[Burst Signal Receiving Operation]
A receiver in the OLT performs the operations of an automatic gain control, an automatic threshold control and a clock reproduction upon receipt of the Laser ON and the Sync Pattern. Also, a start point of the data is detected by the bit pattern detection of the Burst Delimiter, and an end point of the data is detected by the Burst Terminator.

[Description of Waveform Distortion]
The receiver in the OLT receives a correct pattern during the period until the receipt of the Burst Terminator after the completion of the automatic gain control, the automatic threshold control and the clock reproduction. The bit patterns received in the period other than that, that is, in the middle of the signal disable region, the Laser ON region, the laser OFF region and the Sync Pattern region are different from the bit patterns sent by the transmission side, and are likely to become indefinite patterns.

Thus, it is necessary to prevent a malfunction in a logic circuit of the subsequent stage when these indefinite patterns are received. Particularly, it is necessary to prevent the detection of the Burst Delimiter at a wrong position.

[Conventional Example for Preventing Malfunction]
As means for preventing these malfunctions, for example, Patent Documents 1 and 2 are known.

In Japanese Patent Application Laid-Open Publication No. 2001-352353 (Patent Document 1), a gate circuit is provided on the subsequent stage of a limiter amplifier. When the peak value of a preamplifier circuit is smaller than a set value, it is determined as a signal disable region, and the output of the gate circuit is shut off. FIG. 4 shows a receiving circuit including this system. In this system, an indefinite signal output is not issued to the logic circuit on the subsequent stage during a signal disable period. Hence, it is possible to prevent a malfunction of the logic circuit on the subsequent stage during the signal disable period.

In Japanese Patent Application Laid-Open Publication No. 2006-254061 (Patent Document 2), a signal enable determination circuit and a timer circuit are provided by extending the scope of the Patent Document 1, and the output of the gate circuit is released after waiting for only a mask time from the signal enable determination. In the signal disable region and the region having a duty distortion, the output is shut off, and thus, a signal output having little distortion from its top can be realized.

SUMMARY OF THE INVENTION

However, the start of the operation of a CDR (Clock Data Recovery) circuit in the above-mentioned conventional method has to wait until the distortion is reduced. Therefore, the synchronization time required from the start of receipt to the bit synchronization cannot be made shorter than Treceiver+Tcdr. Treceiver represents the time from the start to the end of the automatic gain control and the automatic threshold control, and Tcdr represents the time from the start of the operation of the CDR circuit to the determination of the bit synchronization at a correct position. If there is a CDR circuit that does not malfunction even when a signal containing the distortion is input, the synchronization time can be further shortened.

Hence, a CDR circuit, which can operate even in the region having the waveform distortion and does not make the determination of the bit synchronization at a wrong position, is desired.

The present invention has been made in view of such problems and an object of the present invention is to provide a burst mode receiver including a CDR circuit that does not make the determination of the bit synchronization at a wrong position even when a burst signal waveform containing the distortion is input.

The above and other objects and novel characteristics of the present invention will be apparent from the description of this specification and the accompanying drawings.

The typical ones of the inventions disclosed in this application will be briefly described as follows.

That is, the typical one of the inventions is characterized in that, in a burst mode receiver, a CDR circuit for reproducing clock and data from a received signal, a bit synchronization determination circuit for determining whether the CDR circuit is in an optimum phase, a waveform distortion determination circuit for determining from a received signal whether there is waveform distortion, and a CDR output enable determination circuit for determining whether an output of the CDR circuit is valid or invalid are provided, and the CDR output enable determination circuit performs CDR output enable determination based on a bit synchronization determination result and a waveform distortion determination result.

More specifically, a CDR output enable determination circuit is provided, and a CDR output is made valid when there is no waveform distortion and the bit synchronization is established. In other words, the determination of the bit synchronization is made valid only when there is no waveform distortion, and the determination of the bit synchronization is made invalid when there is the waveform distortion. The logic circuit on the subsequent stage does not malfunction because it is possible to determine whether a received signal is valid or invalid based on the CDR output enable determination. Alternatively, a gate circuit is provided on the subsequent stage of the CDR output, thereby controlling the output of the gate circuit based on the CDR output enable determination.

The effects obtained by typical embodiments of the inventions disclosed in this application will be briefly described below.

That is, the effect obtained by the typical embodiment of the present invention is that the malfunction of the logic circuit on a stage subsequent to the CDR circuit can be prevented even when the burst signal waveform containing the distortion is input. In addition, the synchronization time can be shortened by operating the CDR circuit in a state containing the waveform distortion in the signal enable region of the burst signal.

BRIEF DESCRIPTIONS OF THE DRAWINGS

FIG. 13A is a block diagram showing a configuration example of a waveform distortion determination circuit in the present invention;

FIG. 13B is a timing chart of the waveform distortion determination circuit in the present invention;

DESCRIPTIONS OF THE PREFERRED EMBODIMENTS

Figure 1:
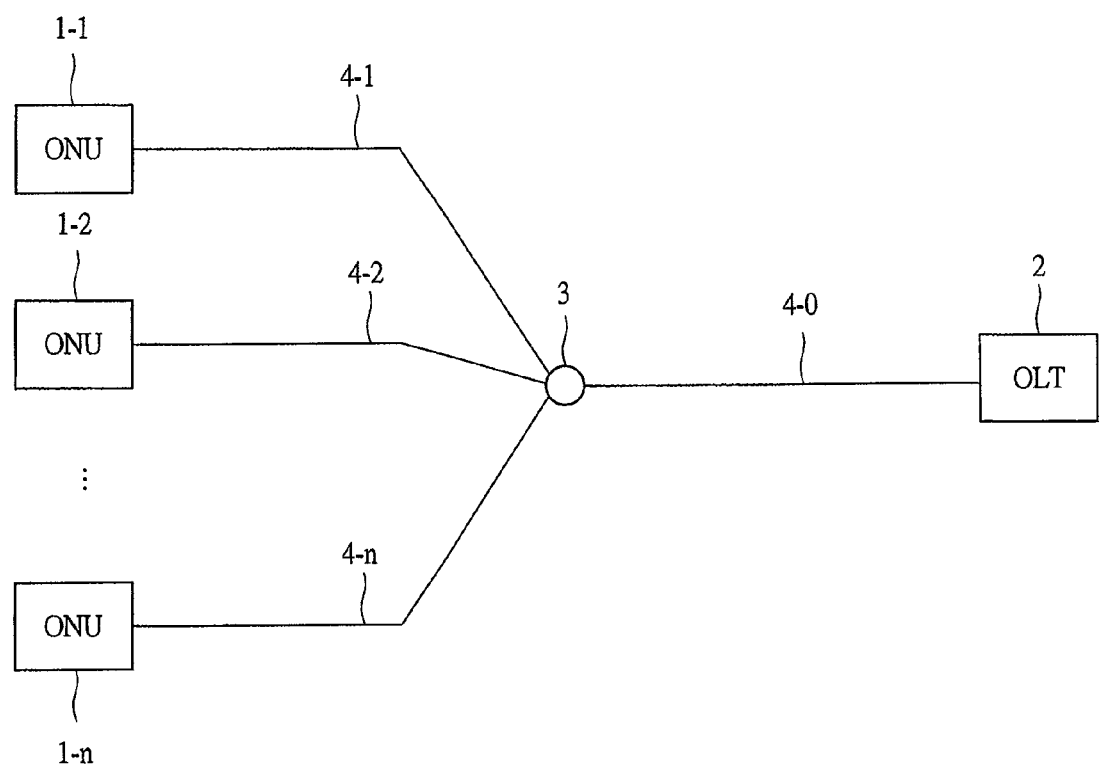
FIG. 1 is a diagram for describing the configuration of an optical access system utilizing a PON to which the present invention is applied.

Embodiments of the present invention will be described below in detail with reference to the drawings. Note that components common to each drawing are denoted by the same reference numerals. Further, though FIGS. 1 to 3 were used also in the section of Background of the Invention as a typical related art, since they can be applied also to the present invention, the embodiments of the present invention will be described below also with reference to these drawings.

First Embodiment

First, a first embodiment of the present invention will be described with reference to FIGS. 1 to 3, FIGS. 5 and 6, FIGS. 13 to 18 and others.

FIG. 1 shows the configuration of an optical access system utilizing a PON to which the present invention is applied. The optical access system is provided with a plurality of ONUs 1 (1-1 to 1-n), an OLT 2, and an optical splitter 3. The optical splitter 3 is connected to the OLT 2 through an optical fiber 4-0. Also, the ONUs 1 (1-1 to 1-n) are connected to the optical splitter 3 through the optical fibers 4 (4-1 to 4-n), respectively.

The signal from each of the ONUs 1 (1-1 to 1-n) to the OLT 2 is a burst signal. Also, since the distance between the ONUs 1 and the OLT 2 varies, the attenuation of the upstream optical signal transmitted from each of the ONUs 1 also varies. Therefore, the OLT 2 receives the burst signal that greatly fluctuates in intensity.

Figure 2:
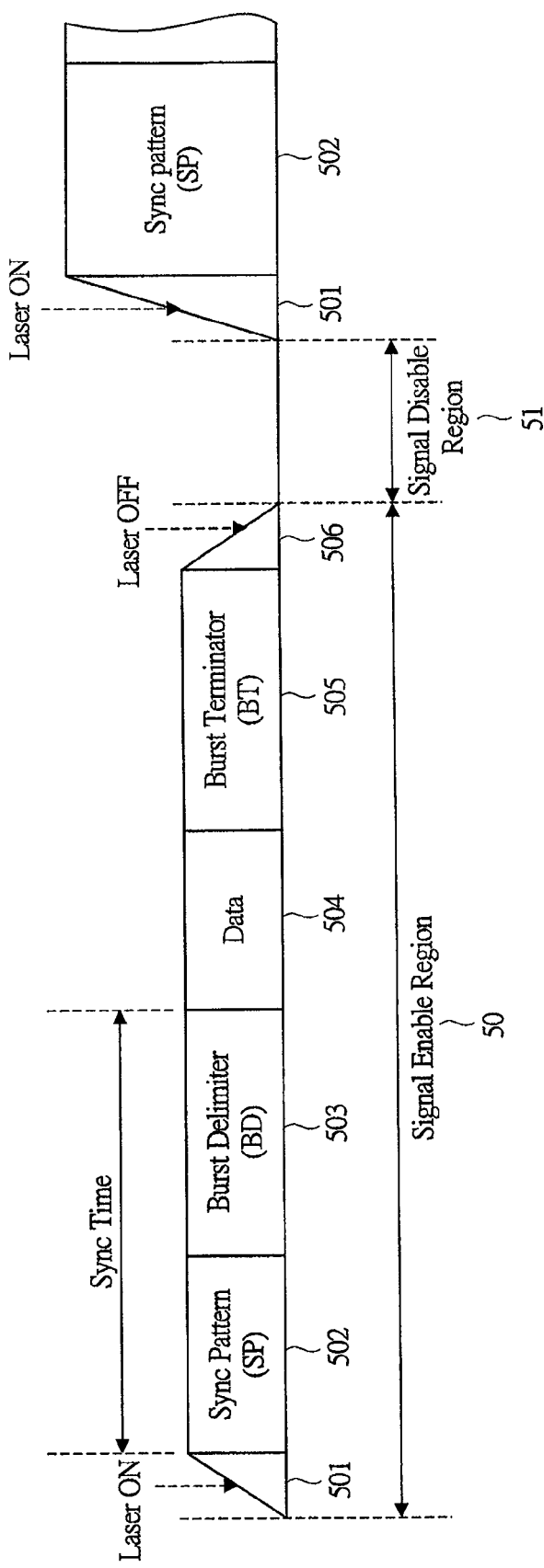
FIG. 2 is a block diagram for describing an upstream burst signal in the PON.

FIG. 2 shows the configuration of the burst signal that the OLT 2 receives. The burst signal can be divided into a signal disable region 51 in which an optical output is approximately 0 and a signal enable region 50 in which an optical output is provided. Also, the signal enable region 50 includes a Laser On region 501, a Sync Pattern (SP) region 502, a Burst Delimiter (BD) region 503, a Data region 504, a Burst Terminator (BT) region 505 and a Laser OFF region 506.

Figure 3:
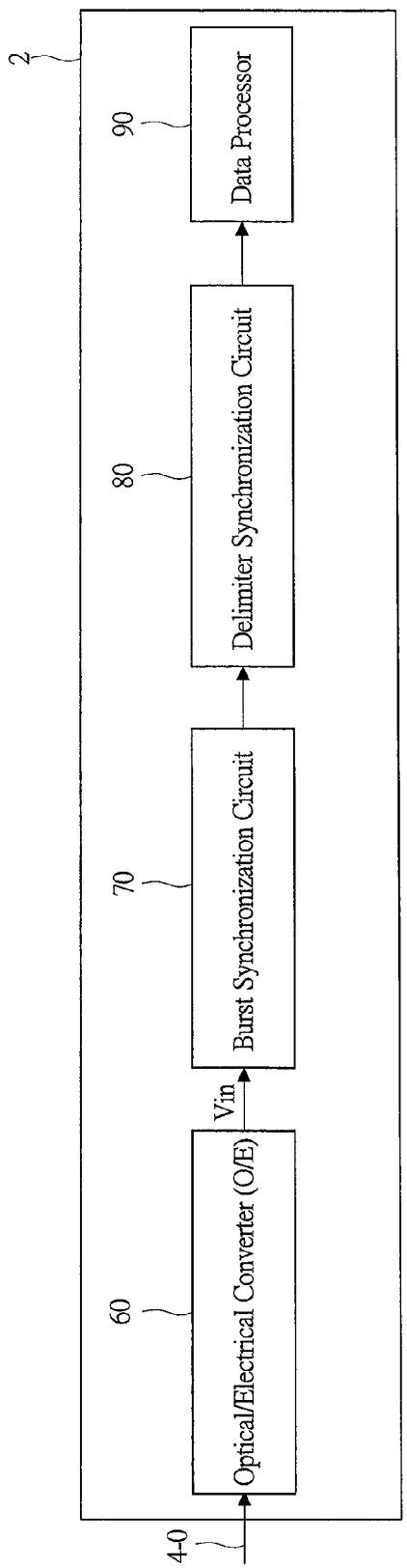
FIG. 3 is a block diagram for describing the configuration of a burst signal receiver of an OLT.
Figure 4:
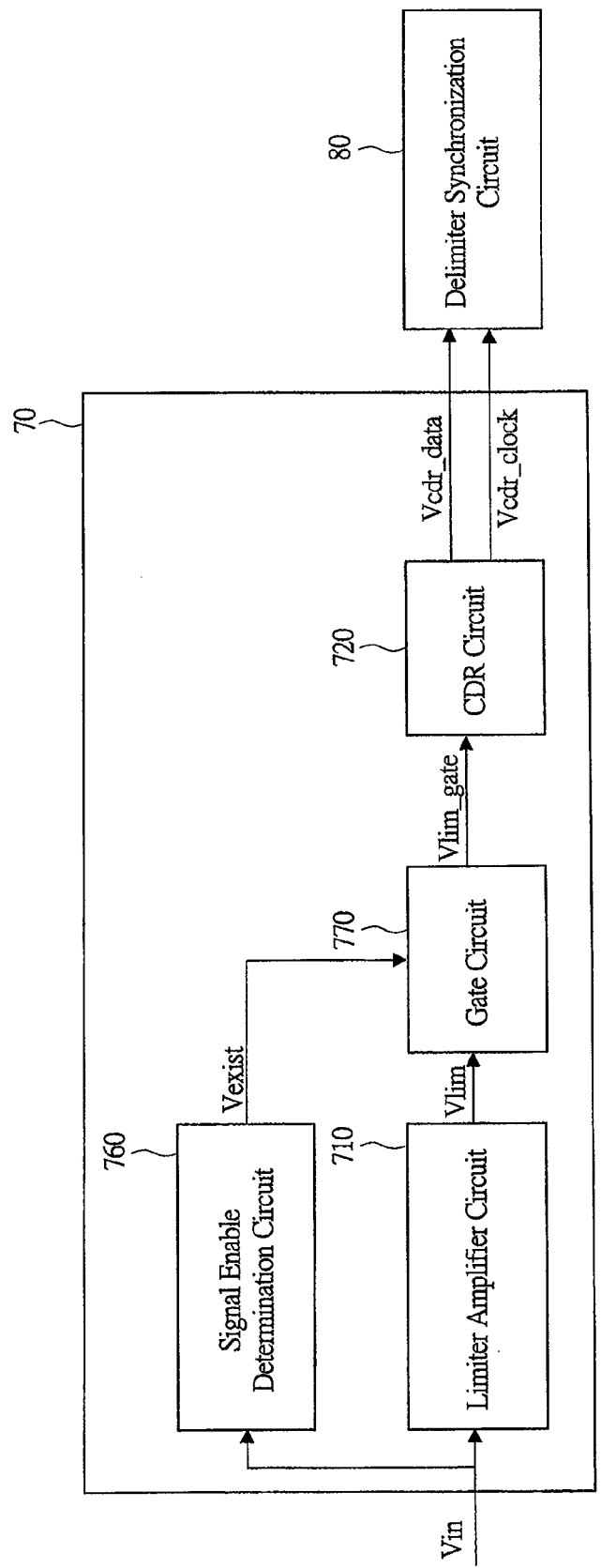
FIG. 4 is a block diagram for describing the configuration of a conventional burst synchronization circuit.

FIG. 3 shows the configuration of a burst signal receiver of the OLT 2. The burst signal receiver is made up of an optical/ electrical converter (O/E) 60, a burst synchronization circuit 70, a delimiter synchronization circuit 80 and a data processor 90.

The optical/electrical converter (O/E) 60 converts a burst optical signal input through the optical fiber 4-0 into an electrical signal. In general, it is made up of a photo diode which changes the optical signal into a current signal and a transimpedance amplifier which changes a current output of the photo diode into a voltage signal. The optical/electrical converter 60 performs an automatic gain control in order to secure a large dynamic range.

The burst synchronization circuit 70 inputs the electrical signal from the optical/electrical converter 60, sets a threshold by an automatic threshold control, and converts the electrical signal into a digital signal based on the threshold. Further, the burst synchronization circuit 70 reproduces clock and data from the digitalized signal and performs a retiming operation for loading the signal in the optimum phase of the received signal.

The delimiter synchronization circuit 80 makes a comparison between the received bit pattern and the bit pattern of the Burst Delimiter region 503. When they are matched or an error bit number is smaller than the specified number, the detection of the Burst Delimiter is determined.

The data processor 90 performs a processing based on the data signal of the Data region 504 after the delimiter synchronization.

Figure 5:
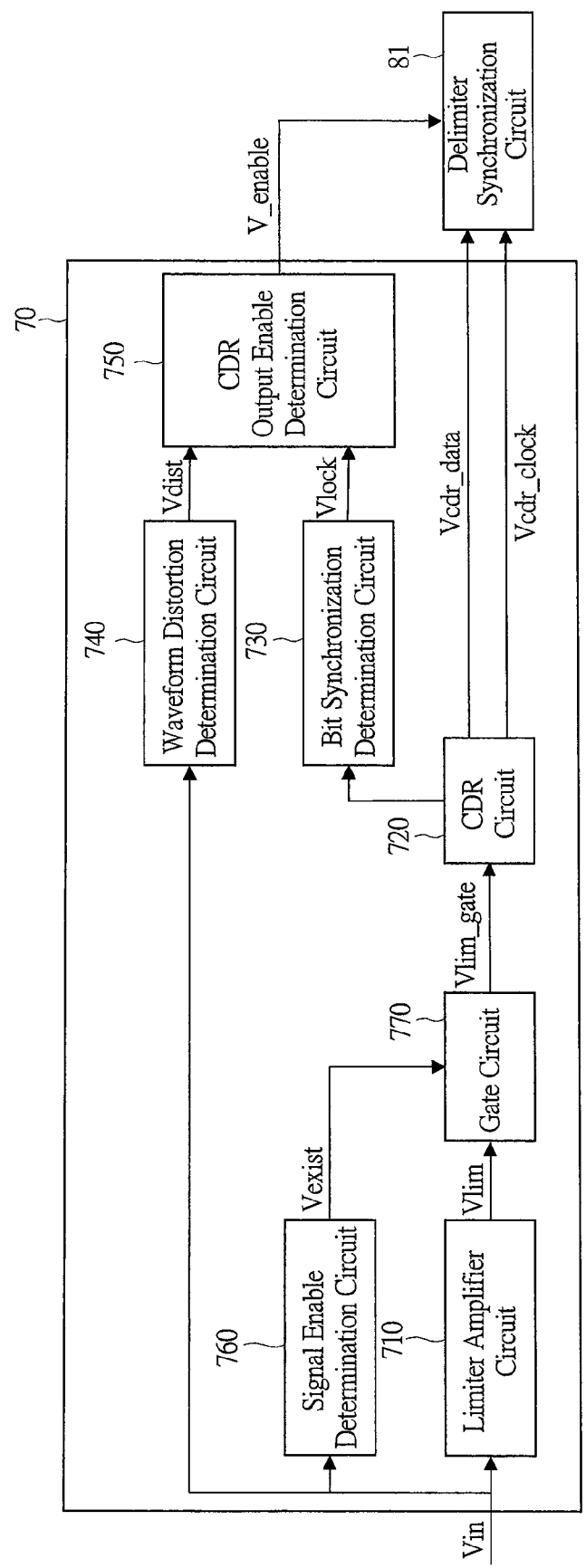
FIG. 5 is a block diagram for describing the configuration of a burst synchronization circuit in a first embodiment of the present invention.

FIG. 5 shows the configuration of the burst synchronization circuit in the first embodiment of the present invention.

The burst synchronization circuit 70 is made up of a limiter amplifier circuit 710 for amplifying the received signal, a CDR circuit 720 for reproducing clock and data from the received signal, a bit synchronization determination circuit 730 for determining whether the CDR circuit 720 is in an optimum phase, a waveform distortion determination circuit 740 for determining from the received signal whether there is waveform distortion, a CDR output enable determination circuit 750 for determining whether the output of the CDR circuit 720 is valid or invalid, a signal enable determination circuit 760 for determining from the received signal whether the burst signal is in a signal enable period or a signal disable period, and a gate circuit 770 for controlling an output of the limiter amplifier circuit 710 and inputting the output to the CDR circuit 720.

To the burst synchronization circuit 70, a delimiter synchronization circuit 81 for detecting a delimiter from the output of the CDR circuit 720 is connected, and the portion including the burst synchronization circuit 70 and the delimiter synchronization circuit 81 corresponds to the burst mode receiver to be the feature of the present invention.

The limiter amplifier circuit 710 performs automatic threshold determination from the received signal Vin and amplifies the signal to a certain amplitude based on the determined threshold. The amplified signal Vlim is input to the gate circuit 770.

The signal enable determination circuit 760 detects an amplitude from the received signal Vin and determines whether the burst signal is in the signal enable region 50 or the signal disable region 51. Then, it outputs a signal Vexist based on the result of the determination. Specifically, an H level is output when determined as the signal enable region 50, and an L level is output when determined as the signal disable region 51.

Figure 15:
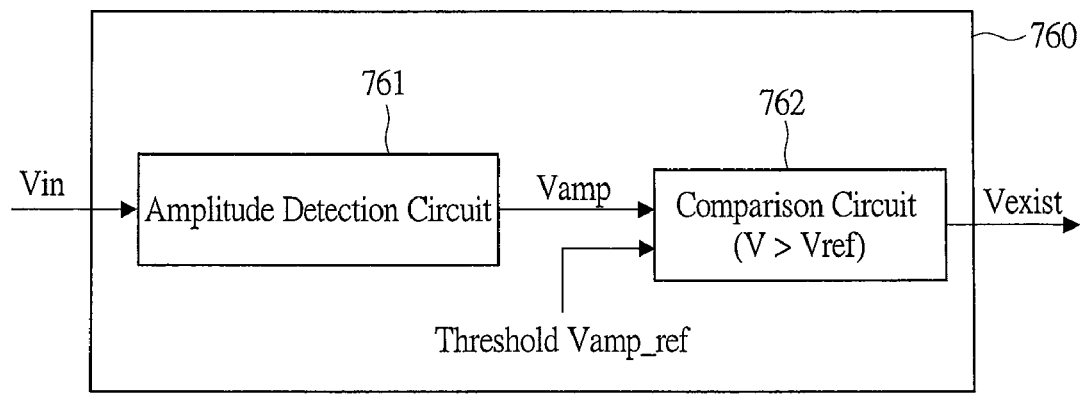
FIG. 15 is a block diagram showing a configuration example of a signal enable determination circuit in the present invention.

Here, a configuration example of the signal enable determination circuit 760 will be described with reference to FIG. 15. The signal enable determination circuit 760 is made up of an amplitude detection circuit 761 and a comparison circuit 762.

The amplitude detection circuit 761 detects an amplitude from the received signal Vin and inputs an amplitude voltage Vamp to the comparison circuit 762. The comparison circuit 762 makes a comparison between the input voltage Vamp and a threshold voltage Vamp_ref and outputs a signal Vexist based on the comparison result. The signal Vexist becomes an H level when Vamp>Vamp_ref, and the signal Vexist becomes an L level when Vamp<Vamp_ref.

Referring back to FIG. 5, the gate circuit 770 inputs the signal Vlim from the limiter amplifier circuit 710 and outputs a signal Vlim_gate to the CDR circuit 720. Also, when the signal Vexist from the signal enable determination circuit 760 is at the H level, Vlim_gate=Vlim, and when the signal Vexist is at the L level, Vlim_gate=L level.

The CDR circuit 720 inputs the signal Vlim_gate from the gate circuit 770, generates an optimum sampling clock based on this signal, and outputs a data signal Vcdr_data and a clock signal Vcdr_clock. Further, the CDR circuit 720 inputs phase information (or data signal and clock signal) to the bit synchronization determination circuit 730.

The bit synchronization determination circuit 730 determines the bit synchronization based on the signal input from the CDR circuit 720 and outputs a signal Vlock based on the result of the determination. Note that, when a state where sampling can be made in the optimum phase for the received signal is reached, it means that the bit synchronization is established, and when a state other than that is reached, it means that the bit synchronization is failed. The output signal Vlock is at the H level when the bit synchronization is established and is at the L level when the bit synchronization is failed.

Here, configuration examples of the bit synchronization determination circuit 730 will be described with reference to FIGS. 16 and 17.

Figure 16:
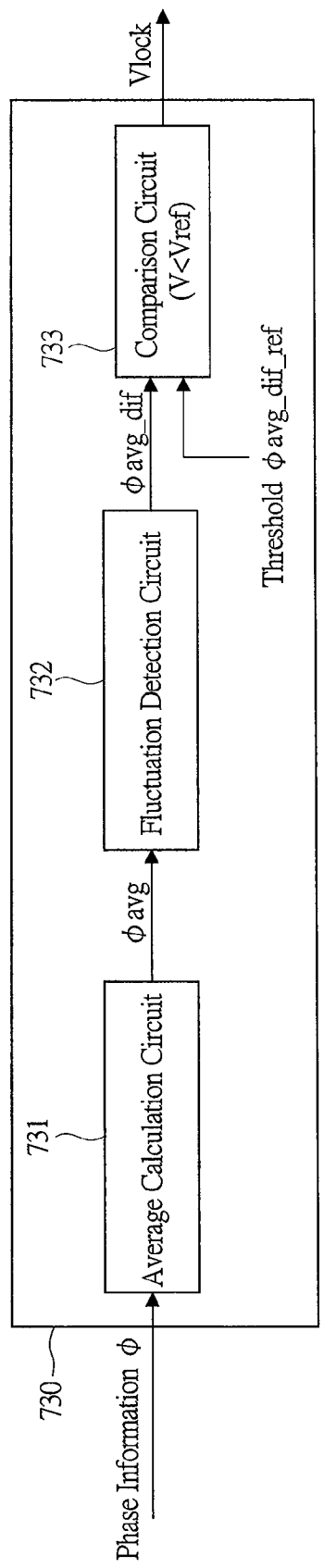
FIG. 16 is a block diagram showing a configuration example of a bit synchronization determination circuit in the present invention.

First, FIG. 16 shows a first configuration example of the bit synchronization determination circuit 730. The bit synchronization determination circuit 730 determines the bit synchronization from phase information ϕ, which is the output of the CDR circuit 720 provided with a phase comparison circuit. The phase information ϕ indicates information of the phase difference as to whether the phase of the clock signal generated by the CDR leads or lags with respect to the received data signal. When the phase of the clock signal generated by the CDR stabilizes, a phase matching operation is thought to be completed, and it means that the bit synchronization is established.

The bit synchronization determination circuit 730 is made up of an average calculation circuit 731, a fluctuation detection circuit 732 and a comparison circuit 733.

The average calculation circuit 731 calculates an average ϕavg of the preset number of times or time from the input phase information ϕ.

The fluctuation detection circuit 732 outputs the fluctuation ϕavg_dif of the average ϕavg over a fixed period of time.

The comparison circuit 733 makes a comparison between the fluctuation ϕavg_dif and a threshold ϕavg_dif_ref, and when ϕavg_dif<ϕavg_dif_ref, it is determined that the bit synchronization is established, and Vlock=H level is output. In other cases, Vlock=L level is output.

Figure 17:
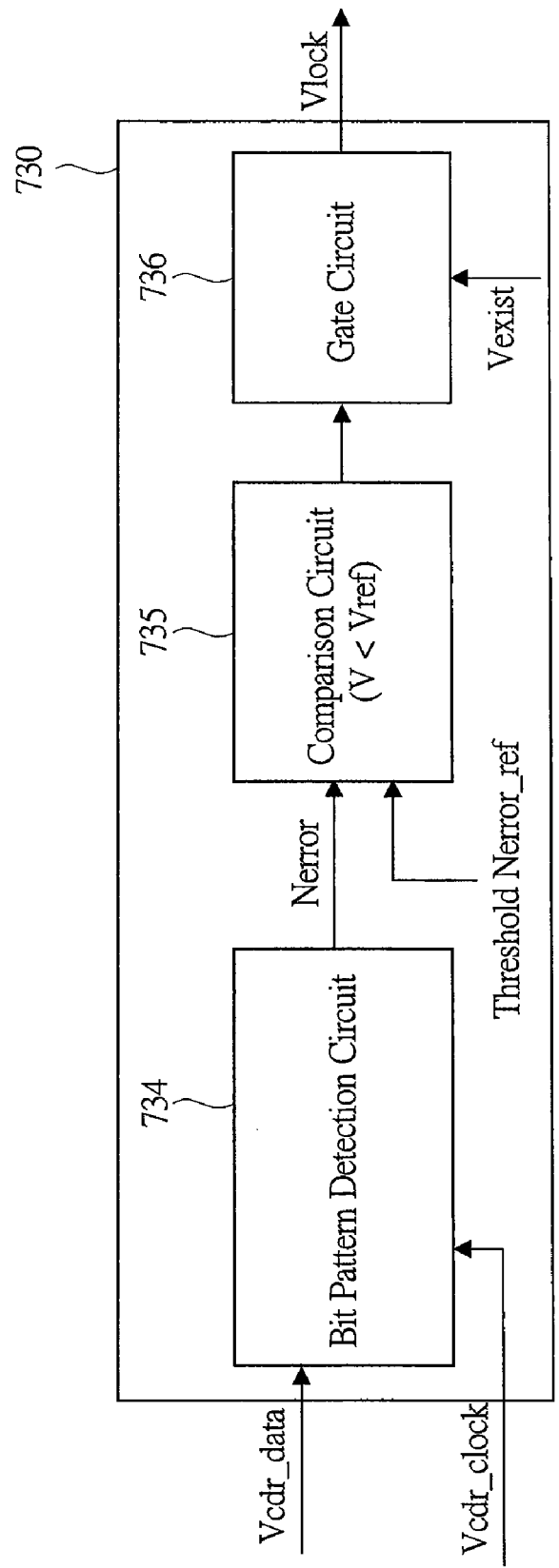
FIG. 17 is a block diagram showing another configuration example of the bit synchronization determination circuit in the present invention.

Next, FIG. 17 shows a second configuration example of the bit synchronization determination circuit 730. In the second configuration example, the received bit pattern and Sync Pattern are compared by using the data signal Vcdr_data and the clock signal Vcdr_clock which are the outputs of the CDR circuit 720, thereby determining the bit synchronization. More specifically, the comparison with the preset N bit pattern is made based on the data signal Vcdr_data and the clock signal Vcdr_clock, and when the bit error number is equal to or less than M bits as a result of this comparison, the bit synchronization is determined.

The bit synchronization determination circuit 730 is made up of a bit pattern detection circuit 734, a comparison circuit 735 and a gate circuit 736.

The bit pattern detection circuit 734 performs 0/1 determination based on the data signal Vcdr_data and the clock signal Vcdr_clock and makes a comparison between the bit pattern obtained by the determination and the Sync Pattern. Further, it outputs the bit error number Nerror which is the result of the comparison. Note that the number of bits to be compared may be decided in advance.

The comparison circuit 735 makes a comparison between the bit error number Nerror and the preset threshold Nerror_ref, and when Nerror<Nerror_ref, it is determined that the bit synchronization is established, and the H level is output. The output of the comparison circuit 735 becomes the H level only when the Sync Pattern is correctly received, and becomes the L level when the Burst Delimiter and the Data are received.

The gate circuit 736 outputs an output level from the comparison circuit 735 only when the signal Vexist from the signal enable determination circuit 760 is at the H level, and always outputs the L level when the signal Vexist is at the L level. By providing this gate circuit 736, the signal Vlock can be set to the H level when the Burst Delimiter and the Date are received.

Note that, though the two configuration examples have been described as the bit synchronization determination circuit 730, these two configurations may be combined in the determination of the bit synchronization. For example, the establishment of the bit synchronization may be determined when the phase of the clock generated by the CDR is stabilized and the received pattern is matched.

Referring back to FIG. 5, the waveform distortion determination circuit 740 determinates from the received signal Vin whether there is the waveform distortion, and outputs a signal Vdist based on the result of the determination. The signal Vdist outputs the H level when it is determined that there is no waveform distortion, and outputs the L level when it is determined that there is the waveform distortion.

Here, a configuration example and timing chart of the waveform distortion determination circuit 740 will be described with reference to FIGS. 13 and 14.

First, a first configuration example and timing chart of the waveform distortion determination circuit 740 will be described with reference to FIGS. 13A and 13B. In this configuration example, whether there is the waveform distortion is determined based on an amplitude fluctuation of the received signal. This waveform distortion determination circuit 740 is made up of an amplitude detection circuit 741, a fluctuation detection circuit 742 and a comparison circuit 743.

The amplitude detection circuit 741 detects and outputs an amplitude voltage Vamp from the received signal Vin. The fluctuation detection circuit 742 detects the fluctuation of the amplitude voltage Vamp and outputs a voltage Vamp_dif. The comparison circuit 743 makes a comparison between the voltage Vamp_dif and a threshold voltage Vamp_dif_ref and sets the output of the signal Vdist to the H level when the absolute value of the voltage Vamp_dif is smaller than the threshold voltage Vamp_dif_ref. In other cases, the comparison circuit 743 sets the output of the signal Vdist to the L level.

Figure 12:
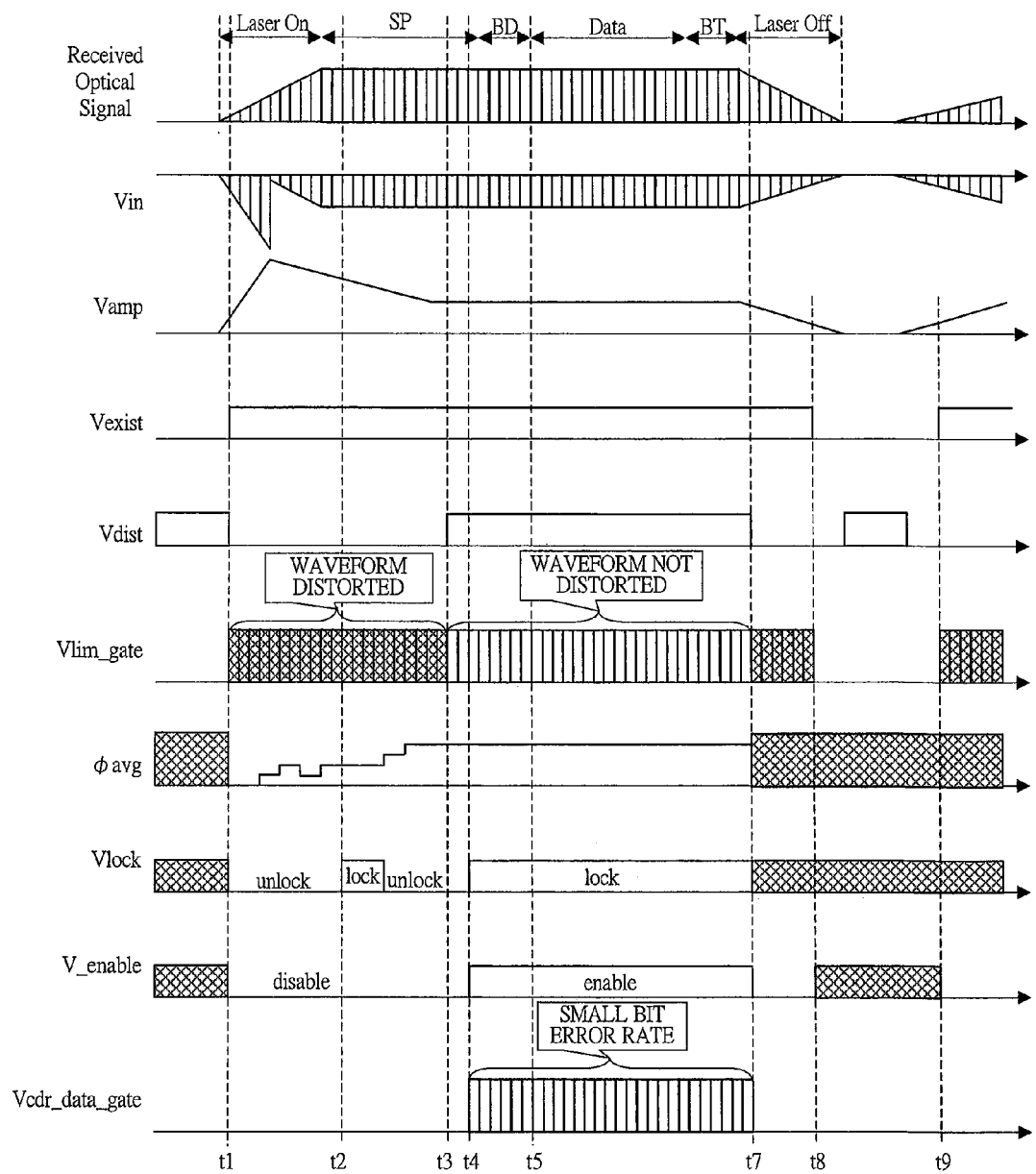
FIG. 12 is a timing chart for describing the operation of the burst synchronization circuit in the fourth embodiment of the present invention.

The timing chart of this configuration is shown also in FIG. 12 to be described later, in which it can be confirmed that the signal Vdist is at the H level in the region having little waveform distortion. Consequently, it is possible to determine the presence or absence of the waveform distortion from the received signal by the above-mentioned configuration.

Figure 14A:
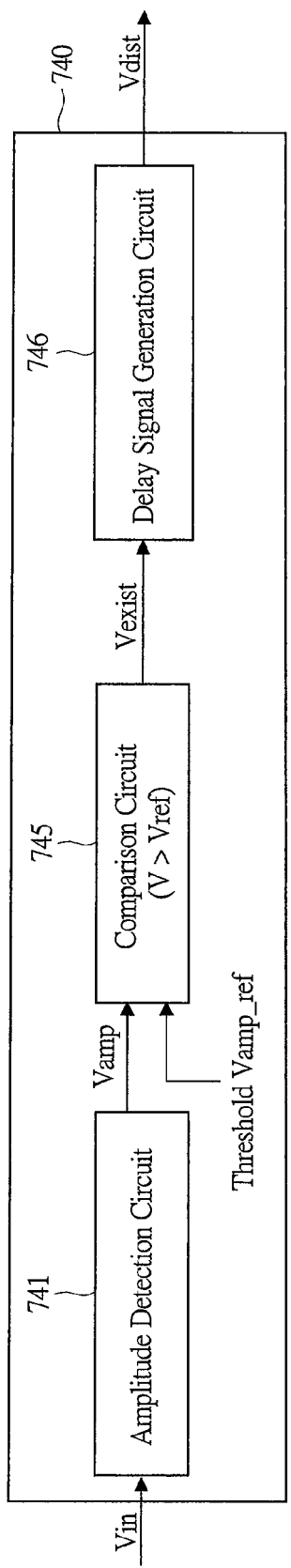
FIG. 14A is a block diagram showing another configuration example of the waveform distortion determination circuit in the present invention.
Figure 14B:
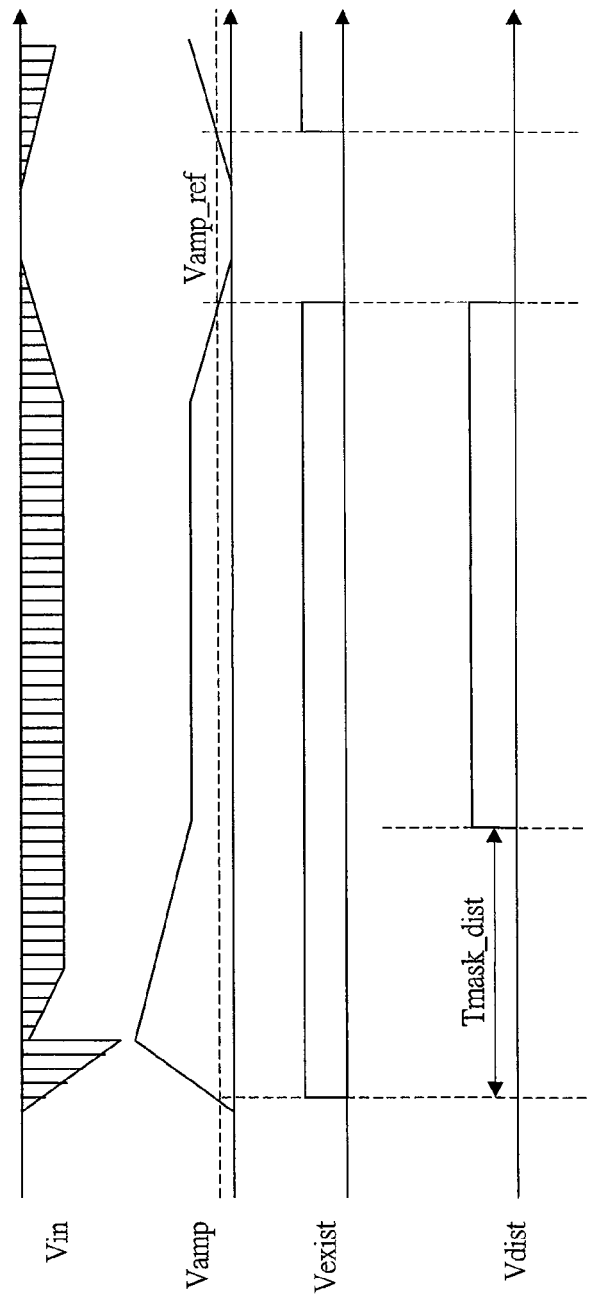
FIG. 14B is a timing chart of the waveform distortion determination circuit in the present invention.

Next, a second configuration example and timing chart of the waveform distortion determination circuit 740 will be described with reference to FIGS. 14A and 14B. In this configuration example, it is determinated that there is no waveform distortion after a fixed time Tmask_dist from the detection of the signal enable period, and when the termination of the signal enable period is detected, it is determinated that there is the waveform distortion. This waveform distortion determination circuit 740 is made up of the amplitude detection circuit 741, a comparison circuit 745 and a delay signal generation circuit 746.

The amplitude detection circuit 741 detects and outputs the amplitude voltage Vamp from the received signal Vin. The comparison circuit 745 makes a comparison between the voltage Vamp and the threshold voltage Vamp_ref and sets the output of the signal Vexist to the H level in case where the voltage Vamp is higher than the threshold voltage Vamp_ref. In other cases, the output of the signal Vexist is set to the L level. The delay signal generation circuit 746 waits for the fixed time Tmask_dist after detecting a rising of the signal Vexist, and then, sets the output of the signal Vdist to the H level. Also, when a falling of the signal Vexist is detected, it sets the output of the signal Vdist to the L level.

Referring back to FIG. 5, the CDR output enable determination circuit 750 determines whether the CDR output is made valid or invalid based on the determination of the waveform distortion determination circuit 740 and the bit synchronization determination circuit 730.

Figure 18A:
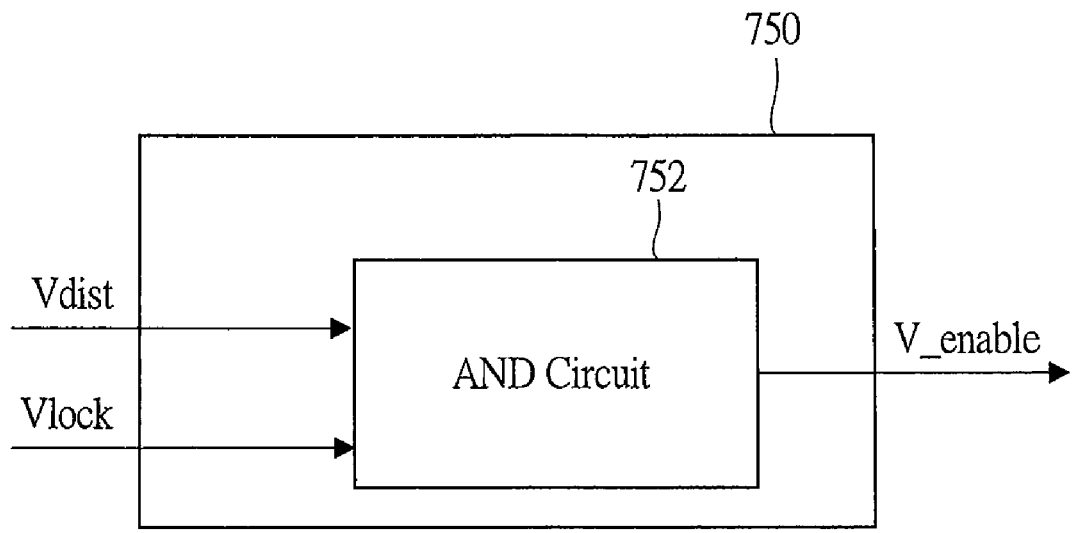
FIG. 18A is a block diagram showing a configuration example of a CDR output enable determination circuit in the present invention.

Here, FIG. 18A shows a configuration example of the CDR output enable determination circuit 750. Note that the configuration example of FIG. 18B will be described later. The CDR output enable determination circuit 750 of FIG. 18A is made up of an AND circuit 752 only and sets a signal V_enable to the H level only when the signal Vdist from the waveform distortion determination circuit 740 and the signal Vlock from the bit synchronization determination circuit 730 are at the H level. In other cases, it sets the signal V_enable to the L level.

Referring back to FIG. 5, the delimiter synchronization circuit 81 connected to the burst synchronization circuit 70 determines validity and invalidity of the determination result of the delimiter synchronization based on the signal V_enable from the CDR output enable determination circuit 750. More specifically, the determination result of the delimiter synchronization is made valid only when the signal V_enable is at the H level.

Figure 6:
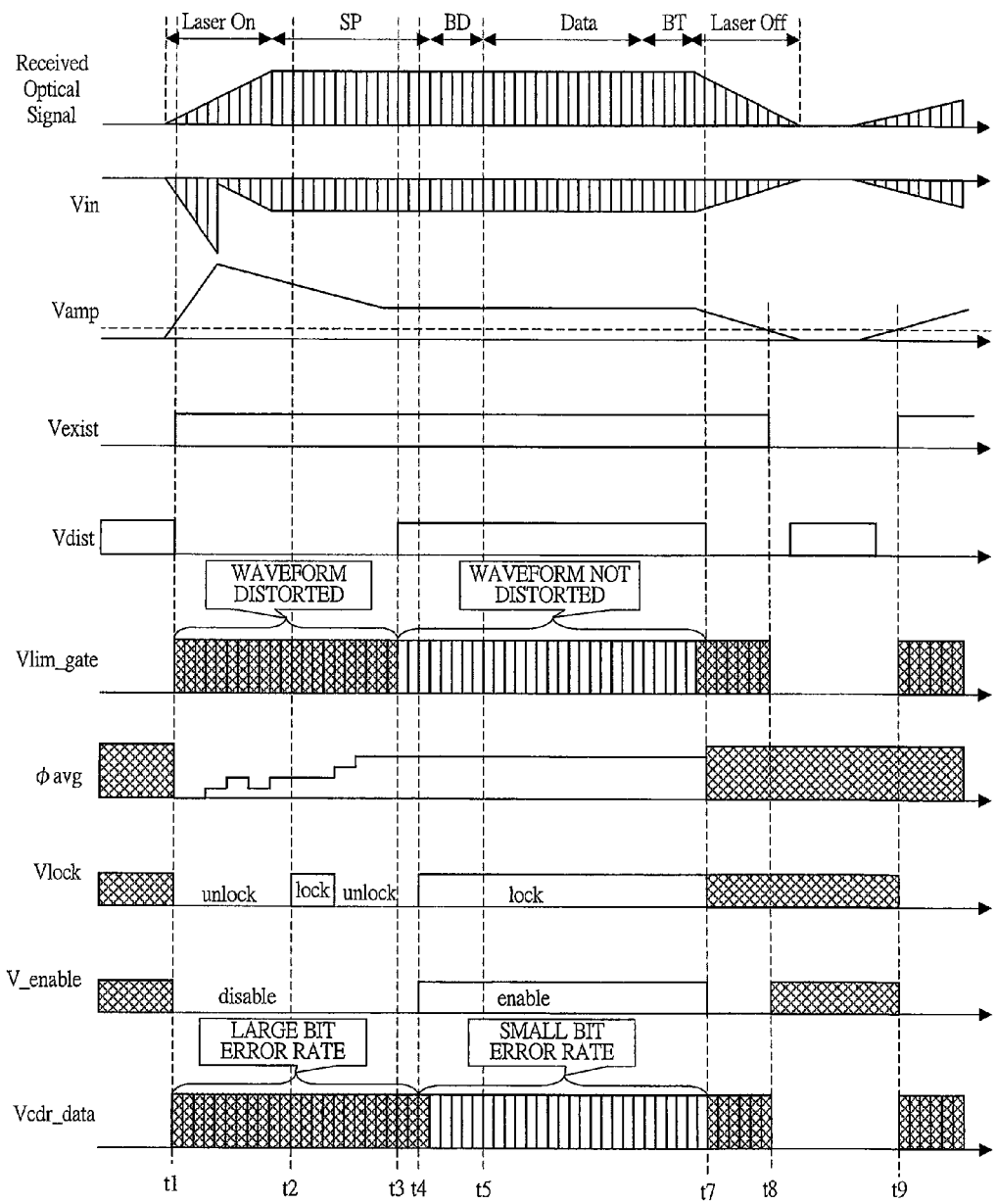
FIG. 6 is a timing chart for describing the operation of the burst synchronization circuit in the first embodiment of the present invention.

Next, the operation of the burst synchronization circuit 70 will be described with reference to the timing chart of FIG. 6.

The timing chart shows respective signals of the received optical signal, the signal Vin input to the burst synchronization circuit, the amplitude detection value Vamp of the signal Vin, the signal enable determination result Vexist, the waveform distortion determination result Vdist, the output of the gate circuit Vlim_gate, the phase of the generation clock of the CDR φavg, the bit synchronization determination result Vlock, the CDR output enable determination result V_enable, and the data output of the CDR circuit Vcdr_data.

Note that a hatched portion in the timing chart indicates a distorted waveform or an indefinite output.

First, the operation at the start of the burst reception will be described. Since the automatic gain adjustment is performed by the optical/electrical converter that receives the received optical signal, the waveform amplitude greatly fluctuates at the burst start point of the signal Vin. In response to it, the output Vamp of the amplitude detection circuit greatly changes. In general, the amplitude detection circuit changes under the influence of the amplitude received previously, and therefore, when the amplitude of the signal Vin stabilizes, the output of the voltage Vamp also stabilizes after the fixed period of delay. Further, the limiter amplifier circuit also performs the automatic threshold detection, and therefore, it includes the waveform containing much distortion until the threshold stabilizes. Consequently, the output of the signal Vlim and the output of the signal Vlim_gate contain the distortion immediately after the start of the reception (t1 to t3).

Since the CDR circuit starts operating upon receipt of the edge of the received waveform, the CDR operation starts from t1. In the period of t1 to t3, the phase φavg is likely to become temporarily stabilized in a wrong phase in a region containing the distortion, and the bit synchronization determination circuit may erroneously determine that the bit synchronization is established at the time t2. When the waveform distortion is reduced, the CDR changes the phase. When the phase changes, the bit synchronization determination circuit determines that the bit synchronization is failed. When the time further elapses, the CDR stabilizes at a correct phase position. The bit synchronization determination circuit establishes the bit synchronization again at t4. In this manner, when the CDR is operated in a state having the waveform distortion, the bit synchronization is erroneously established, and since a logic circuit on the subsequent stage starts operating based on the establishment of the bit synchronization, a false operation in the logic circuit is caused.

In the embodiment of the present invention, since the CDR output enable is determined in accordance with both the waveform distortion determination and the bit synchronization determination, it is possible to recognize that the determination of the bit synchronization establishment at t2 is wrong and the determination of the bit synchronization establishment at t4 is correct. Therefore, by operating the logic circuit on the subsequent stage based on the CDR output enable determination, the malfunction in the logic circuit can be prevented even when the CDR is operated in a region having the waveform distortion. Further, since the CDR is operated from a state having the waveform distortion, the time required until the establishment of the bit synchronization is shortened as compared with the case where the CDR is operated after the waveform distortion is eliminated.

The operation at the termination of the burst signal will be described. Since the amplitude of the signal Vin fluctuates in the Laser Off region, the voltage Vamp is reduced, and the waveform distortion determination circuit determines that there is the waveform distortion. Therefore, the signal V_enable becomes valid in the period from t4 to t7. Further, in the signal disable region, the signal Vdist becomes the H level because the amplitude does not fluctuate. Also, since the output of the bit synchronization determination circuit is indefinite during the signal disable period from the Laser Off, the signal V_enable becomes an indefinite output. However, in the present invention, the output of the signal Vlim_gate always becomes the L level, and therefore, the logic circuit on the subsequent stage does not malfunction during the signal disable period.

Consequently, in the present embodiment, even when the CDR is operated in a state having the waveform distortion, the logic circuit on the subsequent stage does not malfunction. More specifically, the bit synchronization determination circuit 730, the waveform distortion determination circuit 740, the CDR output enable determination circuit 750 and others are provided, and the determination of bit synchronization is made valid only when there is no waveform distortion and the determination of the bit synchronization is made invalid when there is the waveform distortion. By this means, it is possible to prevent the malfunction of the logic circuit on the stage subsequent to the CDR circuit 720 even when a signal waveform containing the distortion is input.

Second Embodiment

Figure 7:
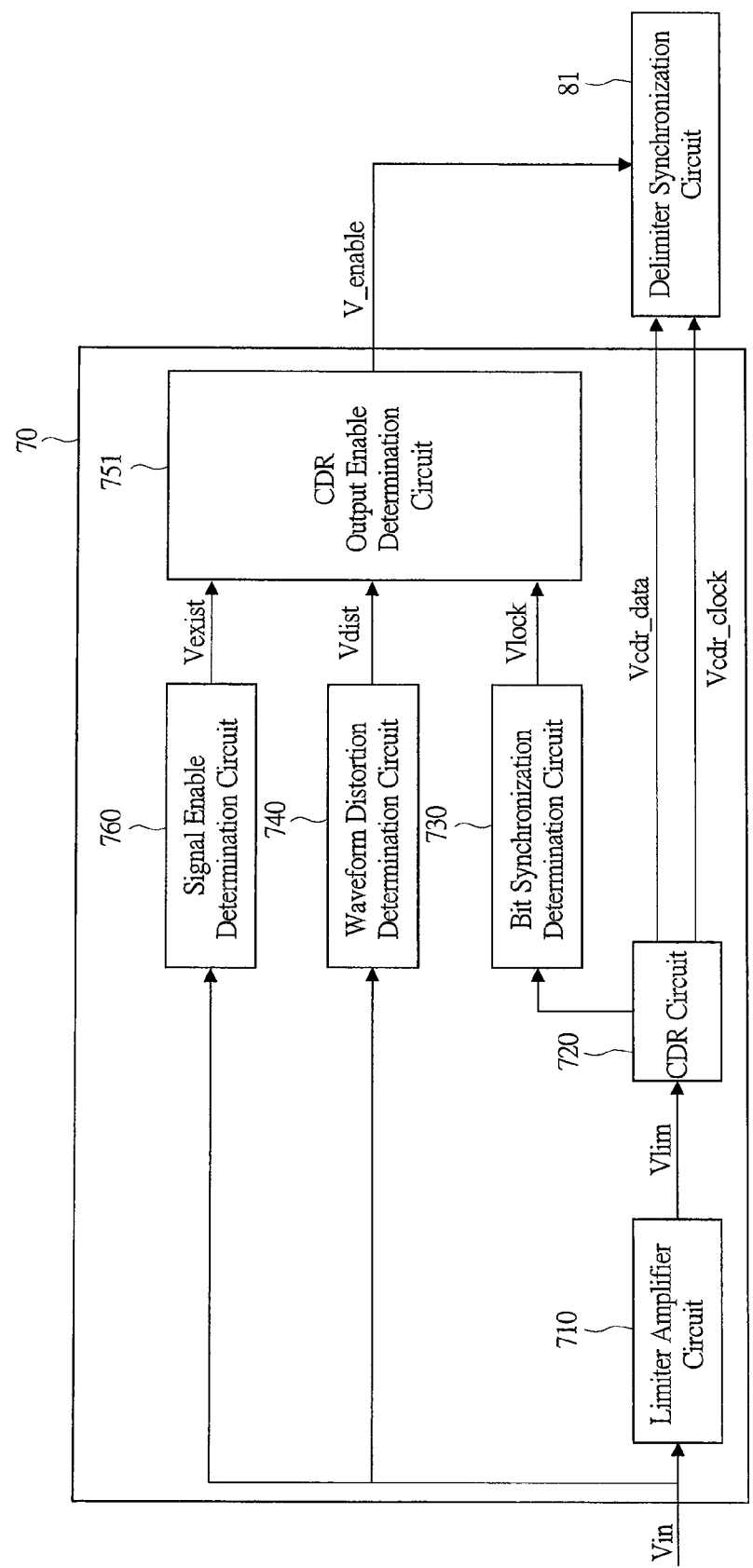
FIG. 7 is a block diagram for describing the configuration of a burst synchronization circuit in a second embodiment of the present invention.
Figure 8:
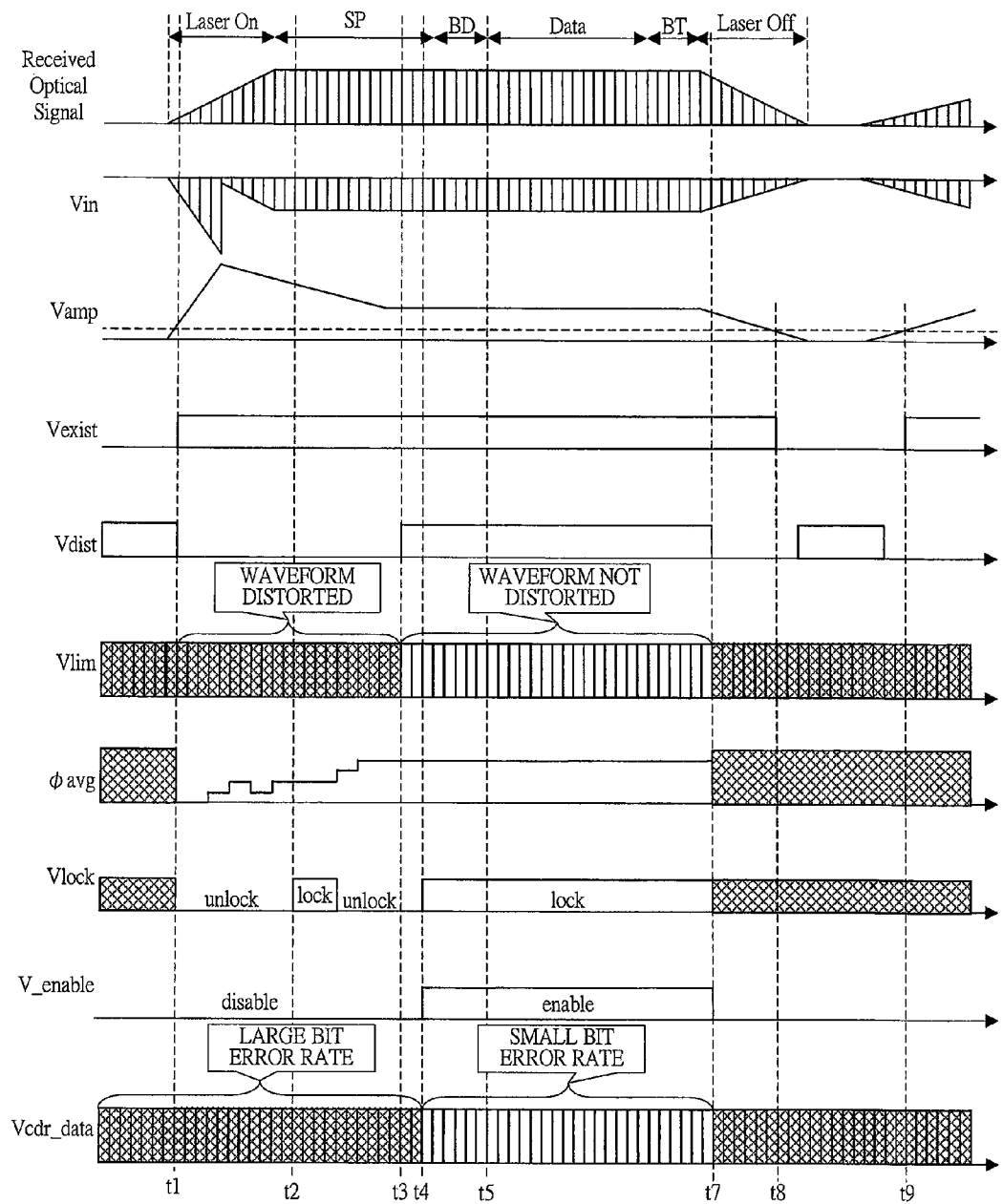
FIG. 8 is a timing chart for describing the operation of the burst synchronization circuit in the second embodiment of the present invention.

Next, a second embodiment of the present invention will be described with reference to FIGS. 7, 8 and 18. The description will be made with a central focus on a difference from the first embodiment.

The configuration of the burst synchronization circuit 70 in the second embodiment will be described with reference to FIG. 7. The difference from the first embodiment is that the gate circuit on the subsequent stage of the limiter amplifier circuit 710 is removed, and the output of the signal enable determination circuit 760 is input to a CDR output enable determination circuit 751.

Figure 18B:
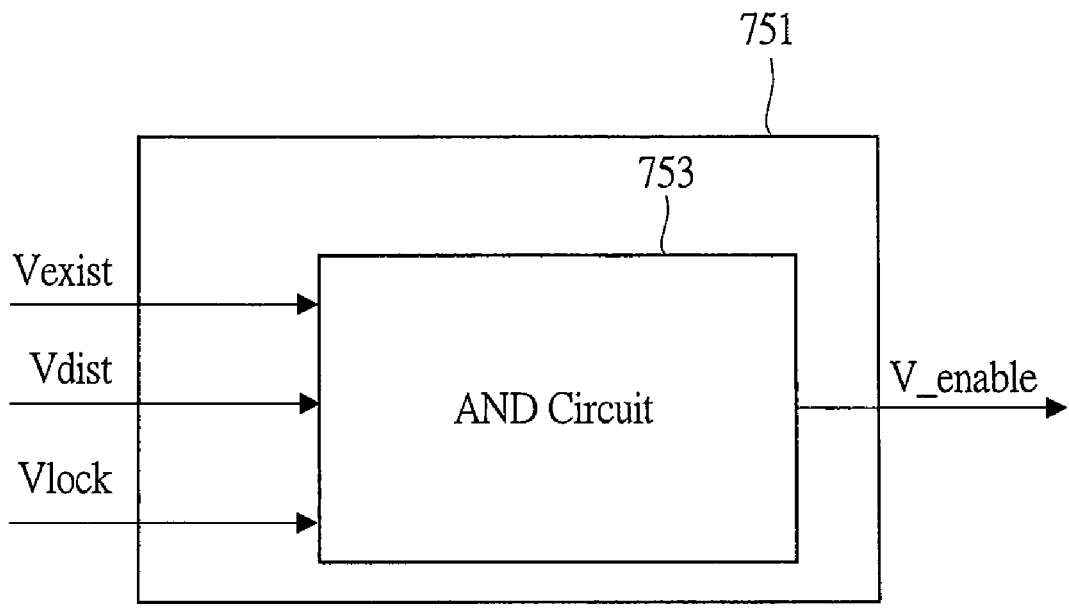
FIG. 18B is a block diagram showing a configuration example of the CDR output enable determination circuit in the present invention.

Also, FIG. 18B shows a configuration example of the CDR output enable determination circuit 751. In this configuration, the CDR output enable determination circuit 751 is made up of an AND circuit 753, and a signal V_enable is set to an H level when a signal Vexist from the signal enable determination circuit 760, a signal Vdist from a waveform distortion determination circuit 740, and a signal Vlock from a bit synchronization determination circuit 730 are all at an H level, and the signal V_enable is set to an L level in other cases.

The operation in this configuration will be described with reference to a timing chart of FIG. 8. Although the operation is approximately the same as that of the first embodiment, the outputs of the signals V_enable and Vcdr_data are different from those of the first embodiment.

In this configuration, since a gate circuit is not provided on the subsequent stage of the limiter amplifier circuit 710, there is an indefinite output of the signal Vcdr_data during a signal disable period of t8 to t9. Further, since the signal Vexist is used for CDR output enable determination, there is no indefinite output of the signal V_enable during the signal disable period of t8 to t9.

Consequently, in the present embodiment, though data outputs of CDR are indefinite during a period having the waveform distortion and during the signal disable period, the CDR enable determination is limited to the period having no waveform distortion in the signal enable period. Hence, similarly to the first embodiment, it is possible to prevent a malfunction in the logic circuit on the subsequent stage.

Third Embodiment

Next, a third embodiment of the present invention will be described with reference to FIGS. 9, 10, 19 and 20. The description will be made with a central focus on the difference from the first embodiment.

Figure 9:
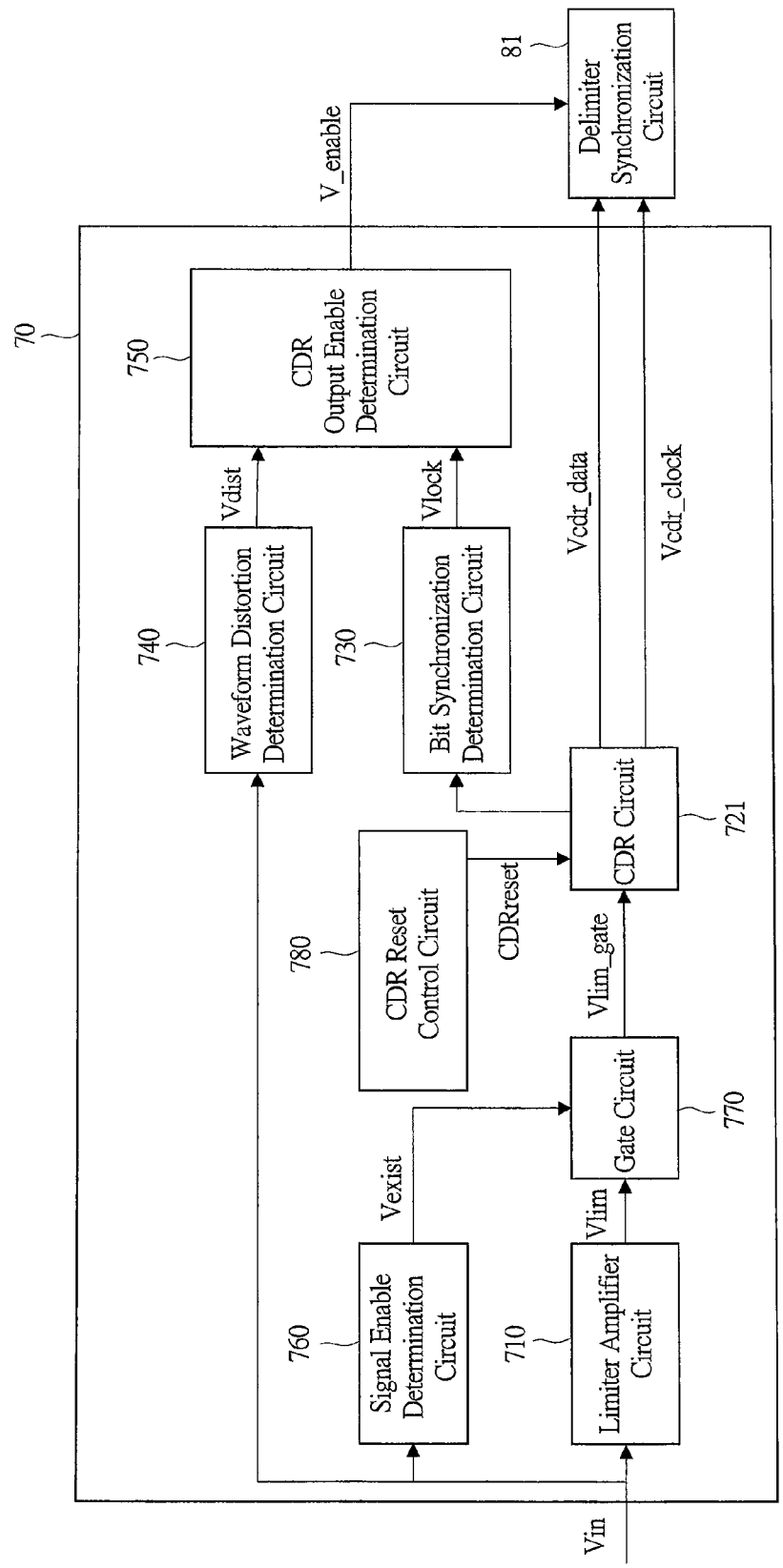
FIG. 9 is a block diagram for describing the configuration of a burst synchronization circuit in a third embodiment of the present invention.

The configuration of the burst synchronization circuit 70 in the third embodiment will be described with reference to FIG. 9. Although there is no particular limitation on a CDR circuit in the first and second embodiments, a CDR circuit 721 with a reset input is employed in this configuration. Further, a CDR reset control circuit 780 for generating a reset timing of the CDR is newly provided.

Upon receipt of a reset input CDRreset from the CDR reset control circuit 780, the CDR circuit 721 performs an operation for matching the phases at high speed for the burst signal, and then switches the operation to an operation for matching the phases with high precision.

The CDR reset control circuit 780 generates the reset signal CDRreset that is input to the CDR circuit 721. This reset signal CDRreset is generated by using a rising of the signal Vexist or a rising of the signal Vdist.

Figure 19A:
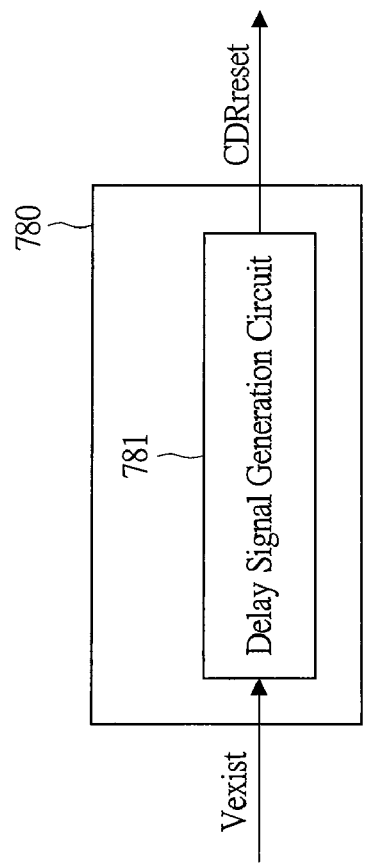
FIG. 19A is a block diagram showing a configuration example of a CDR reset control circuit in the third embodiment of the present invention.
Figure 19B:
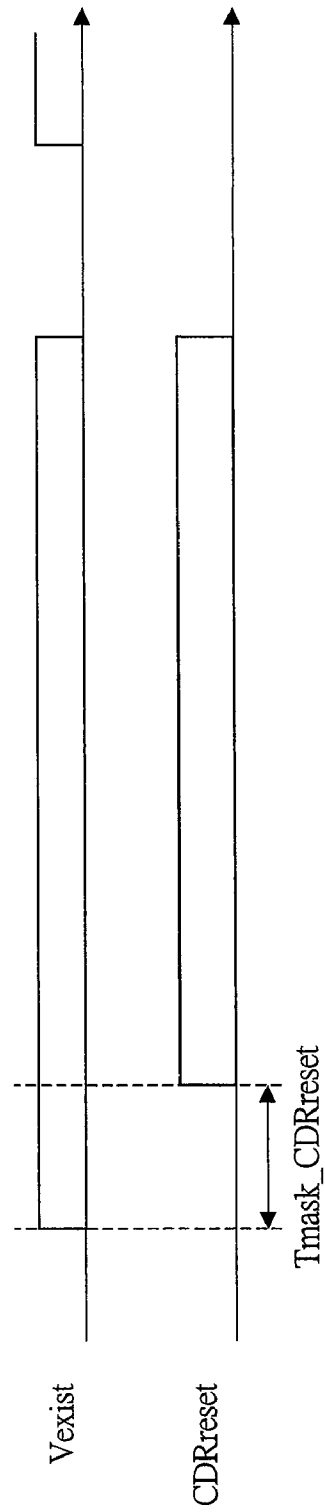
FIG. 19B is a timing chart of the CDR reset control circuit in the third embodiment of the present invention.

Here, a first configuration example and timing chart of the CDR reset control circuit 780 will be described with reference to FIGS. 19A and 19B. The CDR reset control circuit 780 is made up of a delay signal generation circuit 781. The delay signal generation circuit 781 detects a rising of the input signal Vexist, and outputs the reset signal CDRreset after waiting for only a preset delay time Tmask_CDRreset. In this configuration, since the CDR circuit 721 detects a rising of the reset signal, a pulse width of the reset signal is not particularly limited as long as it is within the operational range.

Figure 20A:
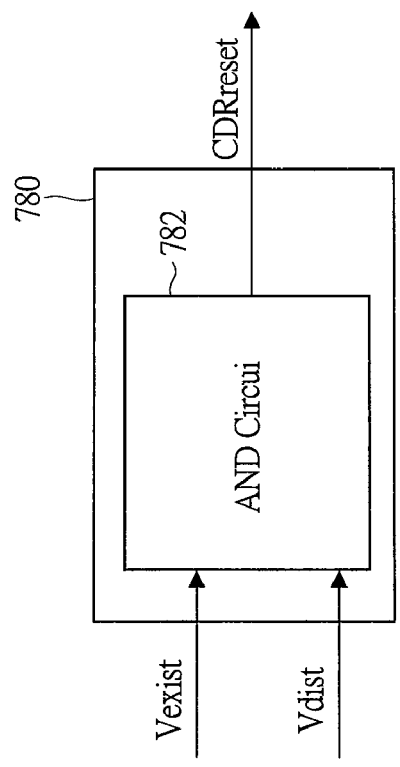
FIG. 20A is a block diagram showing another configuration example of the CDR reset control circuit in the third embodiment of the present invention.
Figure 20B:
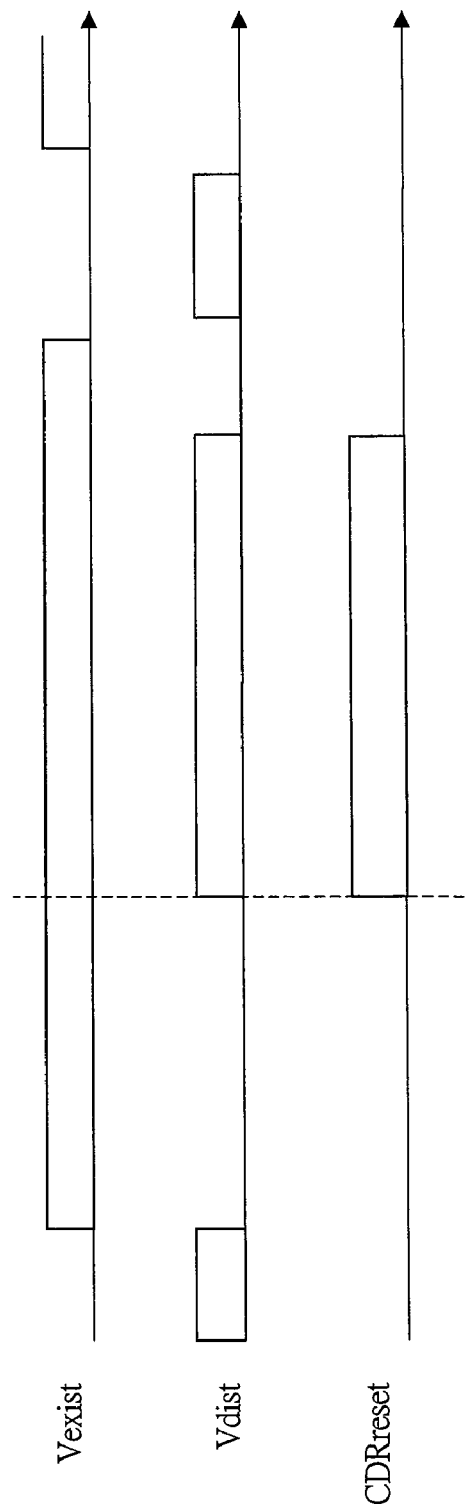
FIG. 20B is a timing chart of the CDR reset control circuit in the third embodiment of the present invention.

A second configuration example and timing chart of the CDR reset control circuit 780 will be described with reference to FIGS. 20A and 20B. In the configuration in which the CDR reset control circuit 780 is provided with an AND circuit 782, the signals Vexist and Vdist are used to generate the reset signal CDRreset. In this configuration, the reset signal CDRreset is output when the signal Vexist is at an H level and a rising of the signal Vdist is detected.

Figure 10:
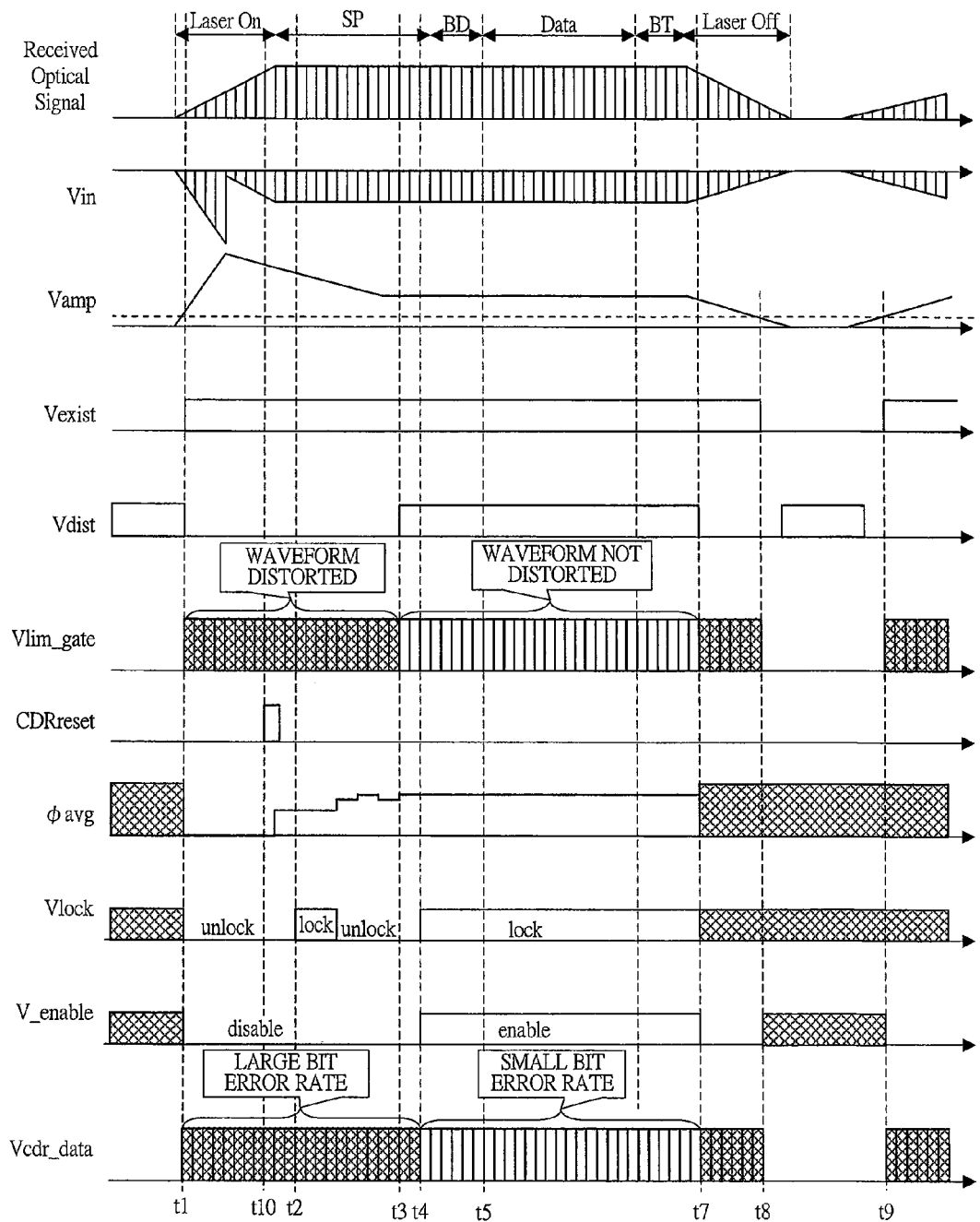
FIG. 10 is a timing chart for describing the operation of the burst synchronization circuit in the third embodiment of the present invention.

The operation of the burst synchronization circuit 70 in the third embodiment will be described with reference to the timing chart of FIG. 10. In this description, the CDR reset control circuit has the configuration shown as the first configuration example.

Different from the first embodiment, the operation of the CDR circuit starts after detecting a rising of the reset signal CDRreset at a time t10 instead of after starting the receipt of the output of a signal Vlim_gate. Immediately after the receipt of this reset signal CDRreset, an operation for matching the phases at high speed is performed. Even in this case also, the bit synchronization is likely to be established in a wrong phase. Therefore, a signal Vlock becomes an H level at a time t2. Thereafter, due to the shift to a correct phase, the bit synchronization is failed. When stabilized in the correct phase, the bit synchronization is established. Similarly to the first embodiment, since the CDR output enable determination becomes valid at a time 4 when the waveform distortion is stabilized and the bit synchronization is established, the malfunction in the logic circuit on the subsequent stage can be prevented.

Consequently, in the present embodiment, by appropriately controlling the reset timing of the CDR, it is possible to establish the bit synchronization almost at the same time when the waveform distortion disappears.

Also, the reset timing and the synchronization time of the CDR are as follows. For example, when the reset timing of the CDR is fast, the operation for matching the phases at high speed is finished in a state having large waveform distortion. Therefore, the operation switches to an operation for matching the phases with high precision in a state where phases are greatly different. Thus, the operating time for matching the phases with high precision becomes long, and there is the possibility that it takes time until the phases are matched even after the waveform distortion disappears. Ultimately, the synchronization time is likely to be long. On the other hand, when the reset timing of the CDR is slow and the operation starts in the state where the waveform is an approximately stabilized, though the time from the start of the CDR operation to the bit synchronization is short, the wait time until the waveform distortion disappears becomes long. Thus, the synchronization time becomes long.

When the reset is applied at the optimum timing, the phases are matched at high speed in a state in which the waveform distortion is reduced to some extent, and thereafter, the operation switches to an operation for matching the phases with high precision. If the bit synchronization is established at the same time when the waveform distortion disappears, the synchronization time can be minimized.

Consequently, in the present embodiment, it is possible to shorten the synchronization time by operating the CDR circuit in a state containing the waveform distortion in the signal enable region of the burst signal.

Note that, according to the present embodiment, the wrong bit synchronization determination can be prevented regardless of the reset timing.

Fourth Embodiment

Figure 11:
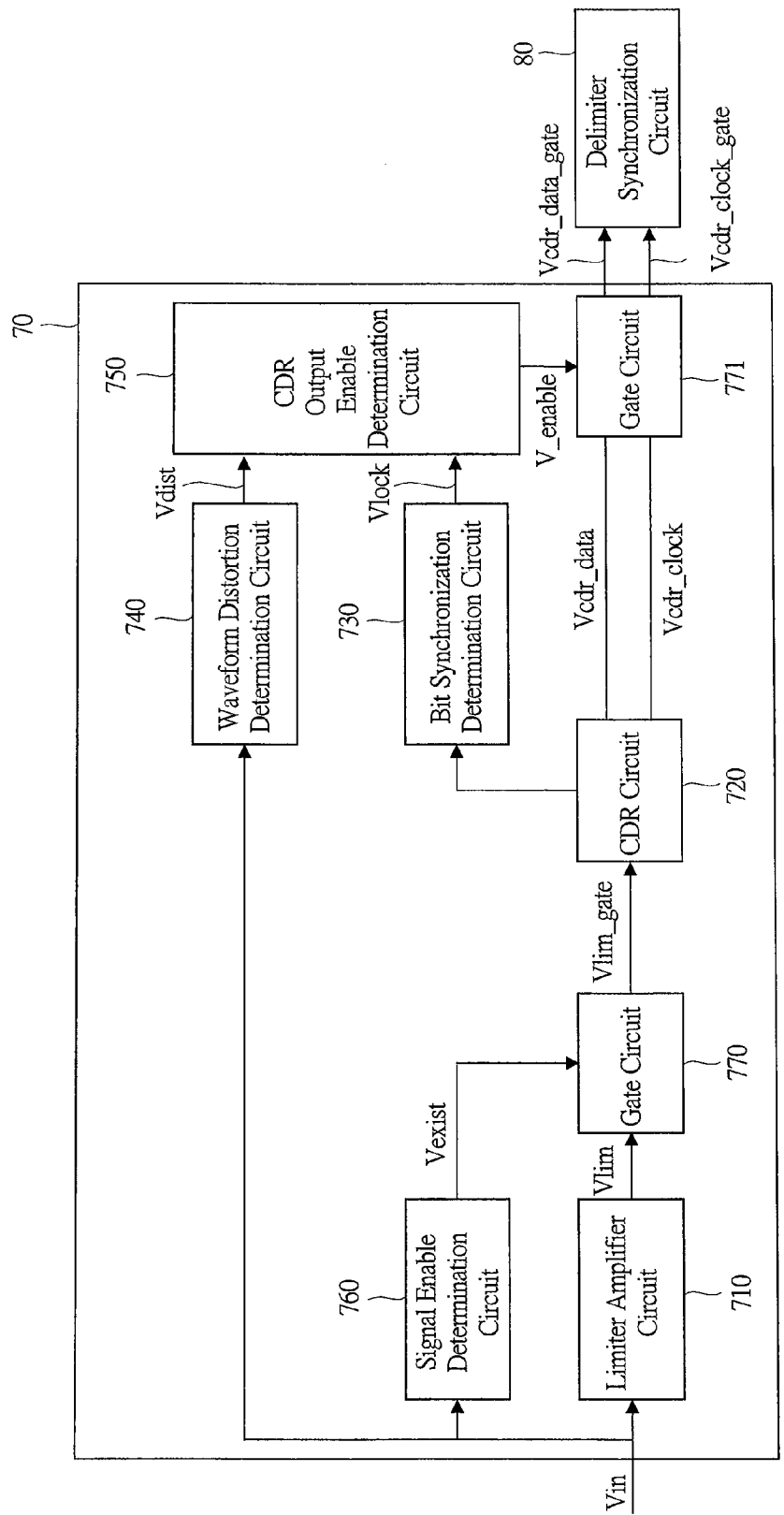
FIG. 11 is a block diagram for describing the configuration of a burst synchronization circuit in a fourth embodiment of the present invention.

Next, a fourth embodiment of the present invention will be described with reference to FIGS. 11 and 12. The description will be made with a central focus on the difference from the first embodiment.

The configuration of the burst synchronization circuit 70 in the fourth embodiment will be described with reference to FIG. 11. The difference from the first embodiment is that a gate circuit 771 is provided on the subsequent stage of the CDR circuit 720 and the gate circuit 771 switches an output based on an output signal V_enable of the CDR output enable determination circuit 750. Further, though the delimiter synchronization circuit 80 in the first embodiment is required to switch the operation based on the output signal V_enable of the CDR output enable determination circuit 750, an operation switch is not needed in the present embodiment, and the delimiter synchronization circuit 80 can always perform the operation of the delimiter synchronization.

When the signal V_enable is at an H level, Vcdr_data_gate is equal to Vcdr_data and Vcdr_clock_gate is equal to Vcdr_clock in the gate circuit 771. On the other hand, when the signal V_enable is at an L level, Vcdr_data_gate is set to an L level and Vcdr_clock_gate is equal to Vcdr_clock in the gate circuit 771.

The operation of the burst synchronization circuit 70 in the fourth embodiment will be described with reference to the timing chart of FIG. 12. The difference from the first embodiment is that the signal Vcdr_data_gate input to the delimiter synchronization circuit 80 has no indefinite output in a signal disable period and a period determined to have the waveform distortion. Therefore, the delimiter synchronization circuit 80 may be operated regardless of the CDR output enable determination.

Consequently, in the present embodiment, even when the CDR is operated in a state having the waveform distortion, the logic circuit on the subsequent state does not malfunction. Further, since the logic circuit on the subsequent stage can be operated regardless of the CDR output enable determination, the logic circuit on the subsequent stage can be simplified.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the description of the aforementioned embodiments, the frame format of 10 GE-PON (IEEE802.3av) has been used, but even the frame formats of GE-PON (IEEE802.3ah) and G-PON can be similarly applied. Further, though the description has been made based on the upstream burst signal of the PON, the present invention can be applied also to the downstream burst signal of an optical access using an optical switch.

INDUSTRIAL APPLICABILITY

The present invention is effectively applied to a circuit which receives the upstream burst signal of PON of the optical access system, and it can be utilized also for the downstream burst signal in the optical access using the optical switch.

What is claimed is:

1. A burst mode receiver comprising:
a limiter amplifier circuit for amplifying a received signal;
a signal enable determination circuit for determining from the received signal whether a burst signal is in a signal enable period or a signal disable period;
a CDR circuit for reproducing clock and data from the received signal;
a bit synchronization determination circuit for determining whether the CDR circuit is in an optimum phase;
a waveform distortion determination circuit for determining from the received signal whether there is waveform distortion; and
a CDR output enable determination circuit for determining whether an output of the CDR circuit is valid or invalid,
wherein the CDR output enable determination circuit performs a CDR output enable determination based on a bit synchronization determination result from the bit synchronization determination circuit, a waveform distortion determination result from the waveform distortion determination circuit, and a signal enable determination result from the signal enable determination circuit.

2. The burst mode receiver according to claim 1, further comprising:
a limiter amplifier circuit for amplifying the received signal;
a signal enable determination circuit for determining from the received signal whether the burst signal is in a signal enable period or a signal disable period; and
a limiter gate circuit for controlling an output of the limiter amplifier circuit and inputting the output to the CDR circuit,
wherein the limiter gate circuit controls a limiter gate output based on the signal enable determination result from the signal enable determination circuit.

3. The burst mode receiver according to claim 2,
wherein the signal enable determination circuit comprises:
an amplitude detection circuit for detecting an amplitude of the received signal; and
a comparison circuit for comparing an output voltage of the amplitude detection circuit and a threshold voltage and determining whether the signal is an enable signal based on this comparison result.

4. The burst mode receiver according to claim 1, further comprising:
a CDR reset control circuit for generating a reset signal to be input to the CDR circuit,
wherein the CDR circuit switches an operation of the CDR circuit based on the reset signal.

5. The burst mode receiver according to claim 4,
wherein the CDR reset control circuit detects a rising of an output signal from the signal enable determination circuit, and outputs a CDR reset signal while being delayed for a preset time after detecting the rising of an output signal from the signal enable determination circuit.

6. The burst mode receiver according to claim 4,
wherein the CDR reset control circuit outputs a CDR reset signal based on an output signal from the signal enable determination circuit and an output signal from the waveform distortion determination circuit.

7. The burst mode receiver according to claim 1, further comprising:
a delimiter synchronization circuit for detecting a delimiter from the output from the CDR circuit,
wherein the delimiter synchronization circuit switches whether delimiter synchronization determination is operated based on a CDR output enable determination result from the CDR output enable determination circuit.

8. The burst mode receiver according to claim 1, further comprising:
a CDR gate circuit for controlling the output of the CDR circuit; and
a delimiter synchronization circuit for detecting a delimiter,
wherein the CDR gate circuit controls an output of a gate based on a CDR output enable determination result from the CDR output enable determination circuit.

9. The burst mode receiver according to claim 1,
wherein the signal enable determination circuit comprises:
an amplitude detection circuit for detecting an amplitude of the received signal; and
a comparison circuit for comparing an output voltage of the amplitude detection circuit and a threshold voltage and determining whether the signal is an enable signal based on this comparison result.

10. The burst mode receiver according to claim 1,
wherein the CDR circuit comprises a phase comparison circuit, and
the bit synchronization determination circuit performs bit synchronization determination based on a phase difference output from the phase comparison circuit.

11. The burst mode receiver according to claim 1,
wherein the bit synchronization determination circuit makes a comparison with a preset N bit pattern based on a data signal and a clock signal output from the CDR circuit, and performs bit synchronization determination when a bit error number is equal to or less than M bits as a result of this comparison.

12. The burst mode receiver according to claim 1,
wherein the waveform distortion determination circuit comprises:
an amplitude detection circuit for detecting an amplitude of the received signal;
a fluctuation detection circuit for detecting fluctuation of the amplitude from an output of the amplitude detection circuit; and
a comparison circuit for determining whether there is waveform distortion based on an amplitude fluctuation value from the fluctuation detection circuit.

13. The burst mode receiver according to claim 1,
wherein the waveform distortion determination circuit comprises:
an amplitude detection circuit for detecting an amplitude of the received signal;
a comparison circuit for making a comparison between an output value from the amplitude detection circuit and a threshold; and
a delay signal generation circuit for determining whether there is waveform distortion based on a comparison result from the comparison circuit and determining that there is no waveform distortion after an elapse of a set time from a time when it is determined that there is waveform distortion.

14. The burst mode receiver according to claim 1, wherein the CDR output enable determination circuit determines that the CDR output is valid when a waveform distortion determination result from the waveform distortion determination circuit indicates no waveform distortion, a bit synchronization determination result from the bit synchronization determination circuit indicates establishment of the bit synchronization, and a signal enable determination result from the signal enable determination circuit indicates the signal enable period, and the CDR output enable determination circuit determines that the CDR output is invalid in other cases.

* * * * *